United States Patent
Oshima

(10) Patent No.: US 8,169,511 B2
(45) Date of Patent: May 1, 2012

(54) IMAGING APPARATUS AND PHOTOGRAPHING CONTROL METHOD

(75) Inventor: Hiroyuki Oshima, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 467 days.

(21) Appl. No.: 12/512,006

(22) Filed: Jul. 29, 2009

(65) Prior Publication Data
US 2010/0026860 A1   Feb. 4, 2010

(30) Foreign Application Priority Data
Jul. 29, 2008   (JP) ................ 2008-194823

(51) Int. Cl.
H04N 9/64   (2006.01)
(52) U.S. Cl. ............................... 348/243; 348/222.1
(58) Field of Classification Search .............. 348/222.1, 348/241, 243
See application file for complete search history.

(56) References Cited

U.S. PATENT DOCUMENTS
2002/0140844 A1   10/2002   Kurokawa et al.

FOREIGN PATENT DOCUMENTS
JP   2002-300478 A   10/2002

*Primary Examiner* — Gevell Selby
(74) *Attorney, Agent, or Firm* — Kimble Intellectual Property Law, PLLC

(57) ABSTRACT

After an end of exposure, a data level of OB signals that are imaging signals output from OB portion 400 are sampled by a CDS circuit 6 twice, to artificially generate two OB signals from each OB signal. Thereby, assuming that the total number of OB signals required to stabilize the black level in the clamp circuit 9 is n, the black level can be stabilized before it is started to output effective signals that are imaging signals from effective pixel portion 200 even if the number of OB signals output from the OB portion 400 is 1/n (in the case where pixel mixing or pixel thinning is performed, or in the case where the number of photoelectric conversion elements in the OB portion 400 is less than n). Accordingly, it is possible to prevent the image degradation by suppressing a wrong black level.

16 Claims, 14 Drawing Sheets

[HORIZONTAL TWO PIXEL MIXING]

HORIZONTALL PIXEL MIXING METHOD

40 LINES

READING ORDER

IMAGING APPARATUS AND PHOTOGRAPHING CONTROL METHOD

CROSS-REFERENCE TO RELATED APPLICATIONS

This application claims the benefit of Japanese Patent Application No. 2008-194823 filed on Jul. 29, 2008, the entire contents of which are hereby incorporated by reference, the same as if set forth at length.

BACKGROUND OF THE INVENTION

1. Technical Field

The present invention relates to an imaging apparatus including a solid-state imaging device having a large number of effective pixel areas that receives subject light to generate charges and a large number of OB pixel areas which are light shielded and output black level determination signals, and also relates to a photographing control method.

2. Description of the Related Art

FIG. 12 is a plan view showing the schematic configuration of a solid-state imaging device of a CCD (Charge Coupled Device) type according to a related art.

A semiconductor substrate made of silicon or the like is formed with a pixel area 100 having an effective pixel portion 200, an OB (optical black) portion 300 and an OB portion 400.

In the pixel area 100, a large number of lines in each of which a large number of photoelectric conversion elements such as photodiodes are arranged in a horizontal direction are arranged in a vertical direction which is perpendicular to the horizontal direction.

A charge generated by each photoelectric conversion element in the pixel area 100 is read out to a vertical charge transfer path (not shown in FIG. 12) in the pixel area 100, and transferred in the vertical direction. Charges of one line transferred in the vertical charge transfer path are transferred in the horizontal direction in a horizontal charge transfer path 500. At the end of the horizontal charge transfer path 500, an output section 600 such as a floating diffusion amplifier (FDA) converts the charges into voltage signals (hereinafter may be referred to as "imaging signals") according to the charge amounts, for output. Thereby, the charges transferred in the horizontal direction are converted into the voltage signals in this output section 600 and output to an outside.

The OB portion 400 is an area formed of several lines, which are completely light shielded, at the end of the pixel area 100 on the horizontal-charge-transfer-path side. The respective photoelectric conversion elements formed in the OB portion 400 constitute an OB pixel area that outputs black level determination signals. In the following description, it is assumed that the number of photoelectric conversion elements in the OB portion 400 is 1200.

The OB portion 300 is an area formed of several (10 in the following explanation) photoelectric conversion elements, which are completely light shielded, in each line at the opposite end to the output section 600, excluding the several lines in the OB portion 400. The respective photoelectric conversion elements formed in the OB portion 300 also constitute the OB pixel area that outputs the black level determination signals.

The effective pixel portion 200 is an area in which the photoelectric conversion elements other than the photoelectric conversion elements in the OB portion 300 and the OB portion 400 are formed. Openings are formed in a light shading film that is provided above the respective photoelectric conversion elements of the effective pixel portion 200, and subject light can enter through the openings. The respective photoelectric conversion elements formed in the effective pixel portion 200 constitute an effective pixel area that receives the subject light to generate charges. In the following description, imaging signals output from the effective pixel area may also be called "effective signals", and imaging signals output from the OB pixel area may also be called "OB signals".

An imaging apparatus having the solid-state imaging device includes a CDS circuit, an amplifier, an AD converter and a clamp circuit. The CDS circuit performs a correlation double sampling process for each imaging signal output from the solid-state imaging device to extract a data component excluding a noise component from each imaging signal for output. The amplifier amplifies the imaging signal output from the CDS circuit. The AD converter converts the imaging signal output from the amplifier into a digital signal. The clamp circuit calculates a moving average of n (n is a natural number of 2 or greater; in the following explanation, it is assumed that n=100) OB signals among the imaging signals output from the AD converter and determines a black level of the effective signals.

FIG. 13 is a view for explaining an operation of the solid-state imaging as shown in FIG. 12 at the time of a normal photographing.

After the end of exposure, unwanted charges in the vertical charge transfer path are swept out at high speed, and an empty transfer is performed. Then, a charge generated in each photoelectric conversion element during an exposure period is read out to the vertical charge transfer path as shown in FIG. 13. For a period from the start of exposure to the end of reading, no signal is input into the clamp circuit. Therefore, a black level which is determined based on the clamp circuit is a constant low value.

After the end of reading the charges, the charges in each line are sequentially transferred onto the horizontal charge transfer path 500, then transferred to the output section 600 and output as imaging signals during a signal output period. During this signal output period, first of all, the OB signals are output successively from the photoelectric conversion elements in the OB portion 400, and data components are extracted from the output OB signals, amplified, converted into the digital form, and input into the clamp circuit.

Assuming that an i-th OB signal input into the clamp circuit is OB(i), the clamp circuit calculates a black level by obtaining an integral value of the input OB signals and dividing this integral value by n (=1,000). For example, if OB(1) is input, OB(1)/1000 is calculated, and if OB(2) is input at the next time, {OB(1)+OB(2)}/1,000 is calculated. In this manner, the black level is updated every time the OB signal is input. In the case where the OB signal following OB(1,001) is input, the oldest OB signal is subtracted from the integral value to be divided by 1,000, the latest OB signal is added to the integral value, and the integral value is divided by 1,000 to update the black level.

Since the clamp circuit performs such an arithmetical operation process, the black level determined by the clamp circuit gradually increases as the number of input OB signals increases, as shown in FIG. 13. And, at the time when 1,000 OB signals are input, the calculated black level is almost stabilized, and after that, the black level transits without great variation.

After 1,200 OB signals are output from the OB portion 400, an operation of (i) outputting the effective signals from each line in the effective pixel portion 200 and the OB portion 300, and (ii) then outputting the OB signals from the same line is performed for all the remaining lines.

JP 2002-300478 A (corresponding to US 2002/0140844 A) describes a method for determining a black level based on imaging signals output by the empty transfer from a solid-state imaging device as shown in FIG. 13. However, since the imaging signals obtained through the empty transfer are different from those obtained in a state where the photoelectric conversion elements are light-shielded, it is difficult to determine the black level precisely.

Minimizing the solid-state imaging device has significantly increased the number of pixels (=photoelectric conversion elements) in recent years. Examples of a method for effectively using the increased number of pixels include a high-sensitivity photography by a pixel mixing drive (a driving method for mixing charges read from photoelectric conversion elements so that a total number of resultant charges is 1/M of the read-out charges and outputting imaging signals according to the charges after mixing). The pixel mixing drive has a merit of improved continuous shooting speed because of the decreased number of imaging signals, as well as an improved S/N due to an increased output signal amount.

However, the inventor found that if the pixel mixing drive is performed in the imaging apparatus shown in FIG. 12, the number of OB signals output from the OB portion 400 decreases to 1/M, so that a black level cannot be stabilized before the start of outputting the effective signals from the effective pixel portion 200, which degrades an image quality.

FIG. 14 is a view showing an operation sequence of the solid-state imaging device shown in FIG. 12 at the time of pixel mixing drive.

The operation from the start of exposure to the reading of charges is the same as that in FIG. 13. After reading the charges, the charges are mixed, for example, in the vertical charge transfer path so as to cause the total number of charges read from the photoelectric conversion elements to be half, and the charges after mixing are transferred. In this case, only the 600 OB signals are output from the OB portion 400. Therefore, at the time when the output of the OB signals from the OB portion 400 is completed, the black level does not reach a stable level as shown in FIG. 14.

To stabilize the black level, it is required that the remaining 400 OB signals are input into the clamp circuit. Since there are only 10 OB pixel areas per line in the OB portion 300, it is required that the imaging signals for 40 lines are output from the solid-state imaging device during a period from the start of outputting the effective signals to the completion of outputting the 400 OB signals. For a period of outputting the imaging signals for 40 lines, the black level determined by the clamp circuit rises toward the stable level. Therefore, the levels of the effective signals, which are obtained from the respective lines with reference to the black levels, would vary line by line during this period.

Accordingly, when shooting is performed in a dark place, for example, an image generated based on the effective signals output from the solid-state imaging devices would be colored in part corresponding to the first 40 lines as shown in FIG. 15. In this way, since the black level is not stabilized on the entire screen, a wrong black level ("floating black" or loss of detail in the shadows) is generated, which degrades an image quality. At the time of pixel mixing drive, the black level of the effective signals is so large that such degradation in the image quality is more conspicuous.

SUMMARY OF THE INVENTION

The invention has been made in view of the above circumstances, and provides an imaging apparatus and a photographing control method which can enhance an image quality while suppressing a wrong black level ("floating black" or loss of detail in the shadows).

[1] According to an aspect of the invention, an imaging apparatus includes a solid-state imaging device, a data component extraction unit and a black level determination unit. The solid-state imaging device includes a plurality of effective pixel areas and a plurality of OB pixel areas. The plurality of effective pixel areas receive subject light to generate charges. The plurality of OB pixel areas is light-shielded and outputs black level determination signals. The data component extraction unit extracts data components excluding noise components from (i) effective signals output from the effective pixel areas and (ii) OB signals output from the OB pixel areas. Imaging signals output from solid-state imaging device include the effective signals and the OB signals. The black level determination unit determines a black level of the data components of the effective signals by calculating an average of n data components of the OB signals extracted by the data component extraction unit, where n is a natural number of 2 or greater. The data component extraction unit performs a multiple extraction process of extracting a data component from one imaging signal m times, for each of at least a part of the OB signals, which are output from the solid-state imaging device, where m is a natural number of 2 or greater.

With the configuration of [1], for example, assuming that n=1,000 and m=2 and that the multiple extraction process is performed for the 500 OB signals from the time when the first OB signal is input into the data component extraction unit to the time when the (n/m)=500th OB signals are input, the black level is stabilized at the time when the 500th OB signal is output from the solid-state imaging device.

Therefore, even if less than n OB signals are output by the time when the effective signal is input, for example, (i) even if the solid-state imaging device has such a device configuration that the n OB signals are output before the effective signal is output, but the number of OB signals is decreased to (n/m) because the charges are mixed or thinned out or (ii) even if the solid-state imaging device has such a device configuration that only (n/m) OB signals are output before the effective signal is output, the black level can be stabilized before the effective signal is output.

Accordingly, degradation of an image quality such as a wrong black level ("floating black" or loss of detail in the shadows) can be prevented.

Also, the solid-state imaging device may have the device configuration that only (n/m) OB signals are output before the effective signal is output. Therefore, the OB pixel area can be made smaller than that of the related art, which allows reduction in a chip area and the high speed photographing. Also, if the chip area is unchanged, the effective pixel area is increased correspondingly to the reduced OB pixel area, to provide more pixels.

[2] The data component extraction unit may extract the m data components in the multiple extraction process by sampling a feed through level of the one imaging signal once, sampling a data level of the one imaging signal m times, and obtaining a difference between each of the m data levels and the one feed through level.

With the configuration of [2], a single extraction process of extracting a data component for one imaging signal once and the multiple extraction process can be switched only by changing the number of times the data level is sampled, thereby simplifying the control.

[3] The data component extraction unit may perform the multiple extraction process for at least a part of the OB signals, which are output during a period from time when the solid-state imaging device starts to output the imaging signal to time when the solid-state imaging device outputs the first effective signal, so that n data components of the OB signals are input into the black level determination unit during the period.

With the configuration of [3], since the multiple extraction process is performed for only the required minimum period, it can be prevented that a time to the photographing completion increases. Also, since an average of the data components of the n OB signals can be calculated before the effective signal is output, image data can be generated using the stable black level after the effective signal is output. Thereby, a wrong black level ("floating black" or loss of detail in the shadows) can be prevented.

[4] The imaging apparatus may further include a driving unit that drives the solid-state imaging device so that an output frequency of the imaging signals from the solid-state imaging device during a period in which the at least part of the OB signal to be subjected to the multiple extraction process are output is lower than that during a period in which the imaging signals other than the OB signals are output.

With the configuration of [4], the multiple extraction process can be performed without the performance of the data component extraction unit being enhanced.

[5] The imaging apparatus may further include a driving unit. When the solid-state imaging device is to output the at least part of the OB signals to be subjected to the multiple extraction process, the driving unit alternately forms (i) a charge storage packet corresponding to each OB signal and (ii) (m−1) empty packets corresponding to the charge storage packet for each OB signal on a horizontal charge transfer path of the solid-state imaging device, and transfers charges in the empty packets to an output section of the solid-state imaging device without resetting a charge transferred from the one of the charge storage packets to the output section after the charge of one of the charge storage packets is transferred to the output section to cause the output section to output a voltage signal in response to the charge of the one of the charge storage packets and before a charge in the charge storage packet next to the one of the charge storage packets is transferred to the output section.

With the configuration of [5], the multiple extraction process can be performed without the performance of the data component extraction unit being enhanced.

[6] S denotes the maximum number of imaging signals that can be output from the solid-state imaging device. M is a natural number of 2 or greater. If the solid-state imaging device is driven in a mode in which the number of imaging signals output from the solid-state imaging device is equal to S/M, the data component extraction unit may perform the multiple extraction process. If the solid-state imaging device is driven in another mode in which the number of imaging signals output from the solid-state imaging device is equal to S, the data component extraction unit may only perform a single extraction process of extracting a data component from one imaging signal once.

With the configuration of [6], only when there is a possibility that a wrong black level ("floating black" or loss of detail in the shadows) occurs, the multiple extraction process is performed to suppress a wrong black level ("floating black" or loss of detail in the shadows), thereby allowing the efficient processing.

[7] The imaging apparatus according may further include an amplification unit that amplifies the imaging signals output from the solid-state imaging device. If a gain set to the amplification unit is equal to or greater than a threshold value, the data component extraction unit may perform the multiple extraction process. If the gain is lower than the threshold value, the data component extraction unit may only perform a single extraction process of extracting a data component from one imaging signal once.

With the configuration of [7], only when a wrong black level ("floating black" or loss of detail in the shadows) is conspicuous, the multiple extraction process is performed to suppress a wrong black level ("floating black" or loss of detail in the shadows), thereby allowing the efficient processing.

[8] The imaging apparatus may further include a temperature detection unit that detects a temperature of the solid-state imaging device. If the temperature detected by the temperature detection unit is equal to or higher than a threshold value, the data component extraction unit may perform the multiple extraction process. If the temperature is lower than the threshold value, the data component extraction unit may only perform a single extraction process of extracting a data component from one imaging signal once.

With the configuration of [8], only when a wrong black level ("floating black" or loss of detail in the shadows) is conspicuous, the multiple extraction process is performed to suppress a wrong black level ("floating black" or loss of detail in the shadows), thereby allowing the efficient processing.

[9] According to another aspect of the invention, there is provided a photographing control method for use in an imaging apparatus. The imaging apparatus includes a plurality of effective pixel areas and a plurality of OB pixel areas. The plurality of effective pixel areas receive subject light to generate charges. The plurality of OB pixel areas is light-shielded and outputs black level determination signals. The method includes: extracting data components excluding noise components from (i) effective signals output from the effective pixel areas and (ii) OB signals output from the OB pixel areas, wherein imaging signals output from solid-state imaging device include the effective signals and the OB signals; and determining a black level of the data components of the effective signals by calculating an average of n extracted data components of the OB signals, wherein n is a natural number of 2 or greater. The extracting includes performing a multiple extraction process of extracting the data component from one imaging signal m times, for each of at least a part of the OB signals, which are output from the solid-state imaging device, m being a natural number of 2 or greater.

[10] The multiple extraction process may extract the m data components by sampling a feed through level of the one imaging signal once, sampling a data level of the one imaging signal m times, and obtaining a difference between each of the m data levels and the one feed through level.

[11] The extracting may include performing the multiple extraction process for at least a part of the OB signals, which are output during a period from time when the solid-state imaging device starts to output the imaging signal to time when the solid-state imaging device outputs the first effective signal, so that n data components of the OB signals are input during the period into a black level determination unit that determines the black level.

[12] The photographing control method may further include driving the solid-state imaging device so that an output frequency of the imaging signals from the solid-state imaging device during a period in which the at least part of the OB signal to be subjected to the multiple extraction process are output is lower than that during a period in which the imaging signals other than the OB signals are output.

[13] The photographing control method may further include: when the solid-state imaging device is to output the at least part of the OB signals to be subjected to the multiple extraction process, alternately forming (i) a charge storage packet corresponding to each OB signal and (ii) (m−1) empty packets corresponding to the charge storage packet for each OB signal on a horizontal charge transfer path of the solid-state imaging device, transferring a charge of one of the charge storage packets to an output section of the solid-state imaging device to cause the output section to output a voltage signal in response to the charge of the one of the charge storage packets, and thereafter, transferring charges in the empty packets to the output section without resetting the charge transferred from the one of the charge storage packet to the output section before a charge in a next charge storage packet is transferred to the output section.

[14] S denotes the maximum number of imaging signals that can be output from the solid-state imaging device. M is a natural number of 2 or greater. If the solid-state imaging device is driven in a mode in which the number of imaging signals output from the solid-state imaging device is equal to S/M, the extracting may perform the multiple extraction process. If the solid-state imaging device is driven in another mode in which the number of imaging signals output from the solid-state imaging device is equal to S, the extracting may only perform a single extraction process of extracting a data component from one imaging signal once.

[15] The photographing control method may further include amplifying the imaging signals output from the solid-state imaging device. If a gain set for the amplifying is equal to or greater than a threshold value, the extracting may perform the multiple extraction process. If the gain is lower than the threshold value, the extracting may only perform a single extraction process of extracting a data component from one imaging signal once.

[16] The photographing control method may further include detecting a temperature of the solid-state imaging device. If the detected temperature is equal to or higher than a threshold value, the extracting may perform the multiple extraction process. If the detected temperature is lower than the threshold value, the extracting may only perform a single extraction process of extracting a data component from one imaging signal once.

With the above configurations and methods, it is possible to provide the imaging apparatus and the photographing control method which can enhance an image quality by suppressing a wrong black level ("floating black" or loss of detail in the shadows).

DETAILED DESCRIPTION OF EMBODIMENTS OF THE INVENTION

Exemplary embodiments of the present invention will be described below with reference to the accompanying drawings.

(First Embodiment)

Figure 1:
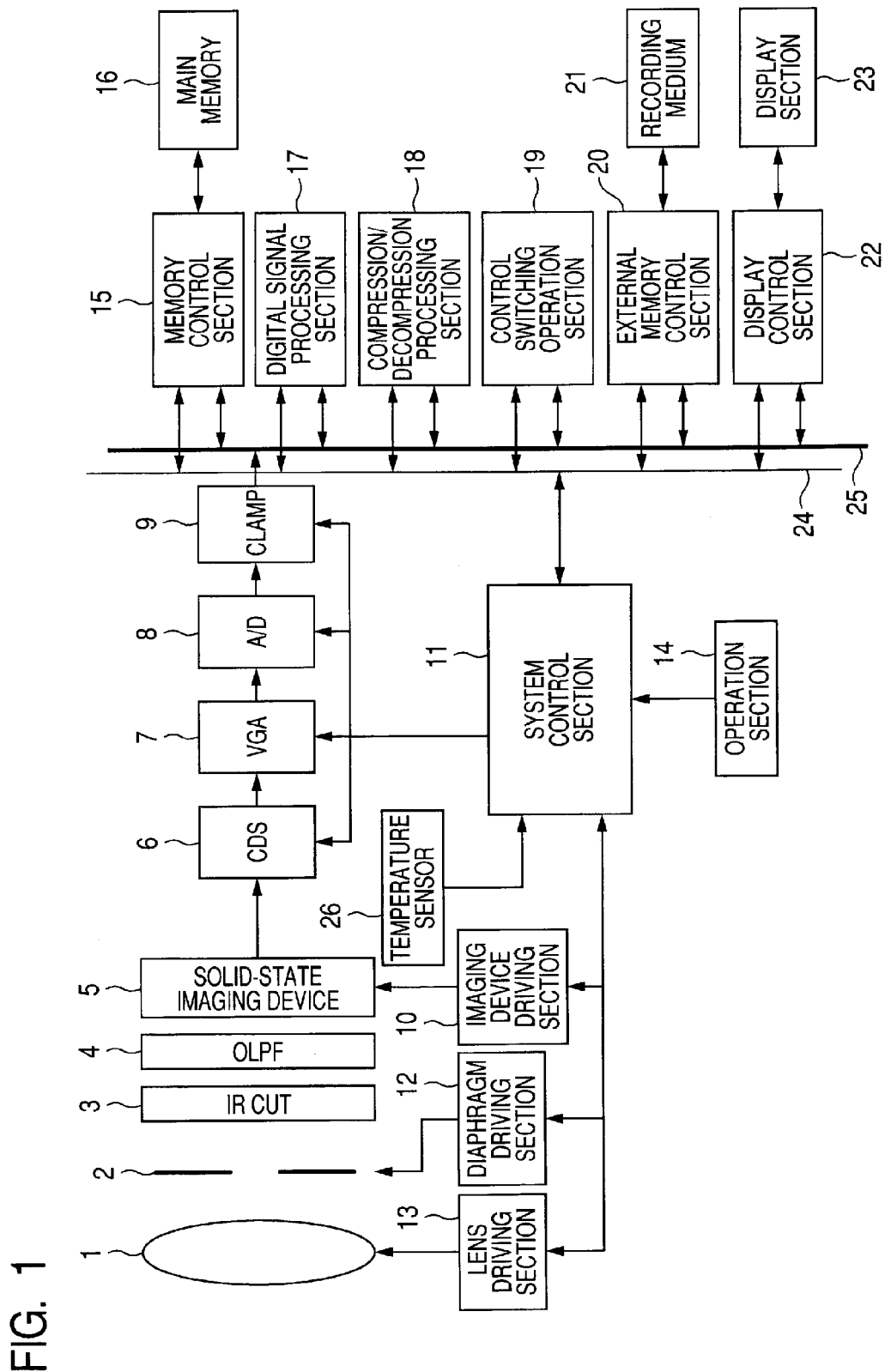
FIG. 1 is a diagram showing the schematic configuration of a digital camera in one example of an imaging apparatus according to a first embodiment of the invention.

FIG. 1 is a diagram showing the schematic configuration of a digital camera in one example of an imaging apparatus according to a first embodiment of the invention.

Figure 12:
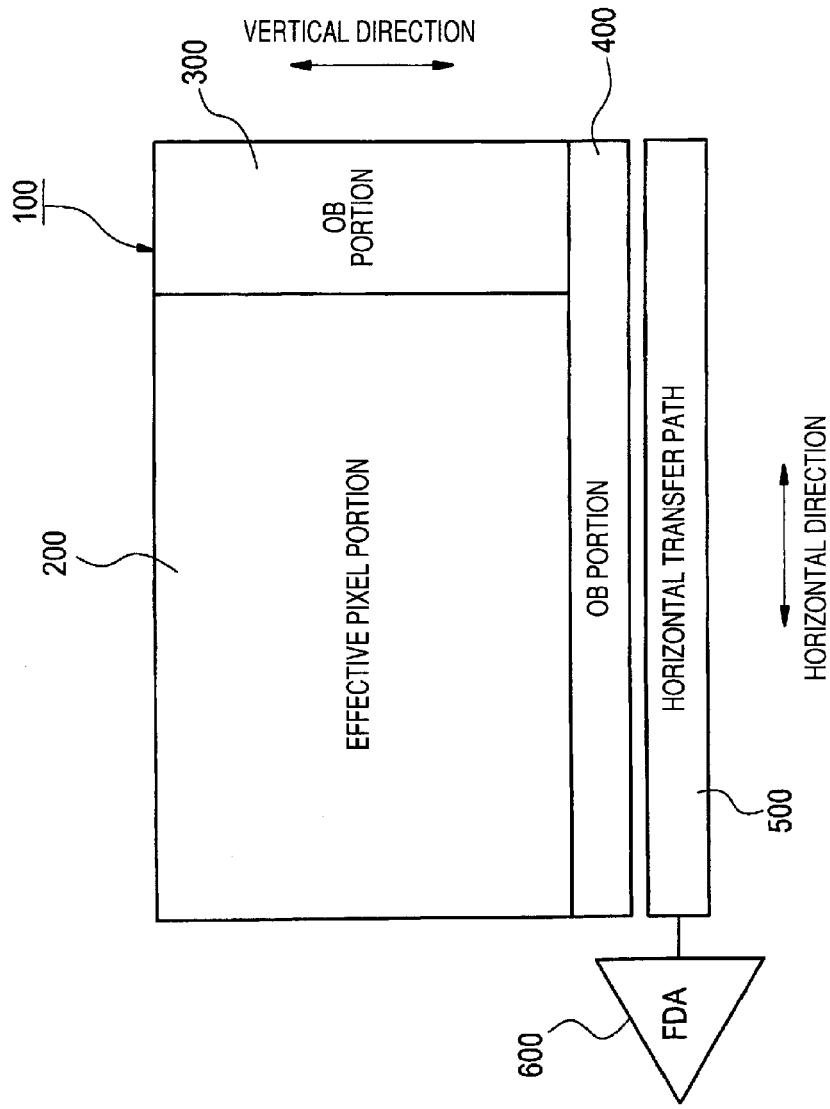
FIG. 12 is a plan view showing the schematic configuration of a solid-state imaging device of a CCD (Charge Coupled Device) type according to a related art.
Figure 13:
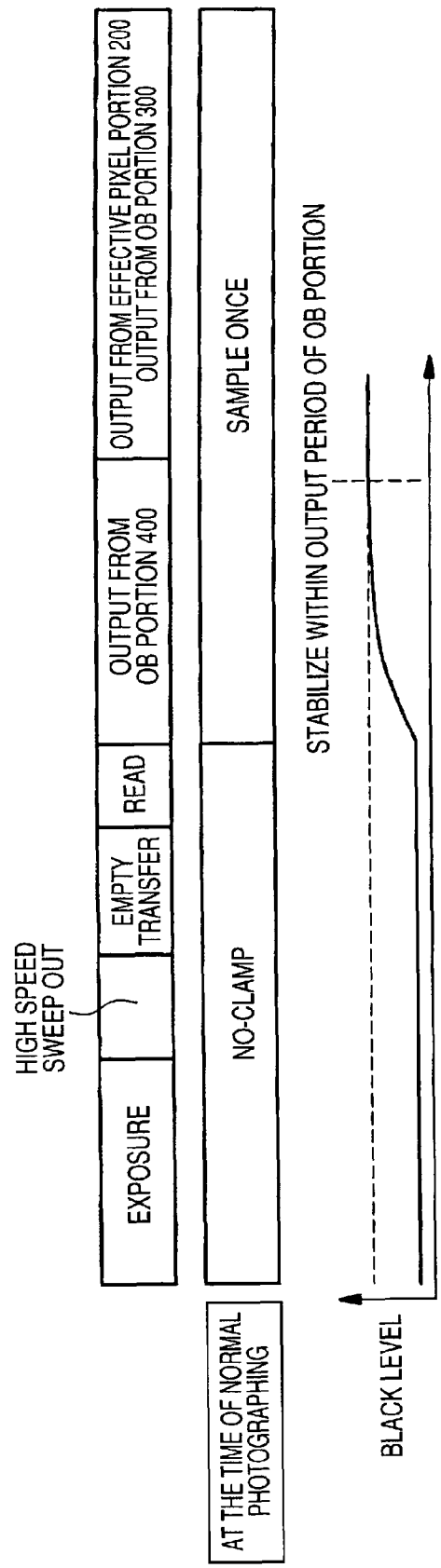
FIG. 13 is a view for explaining an operation of the solid-state imaging device shown in FIG. 12 at the time of a normal photographing.
Figure 14:
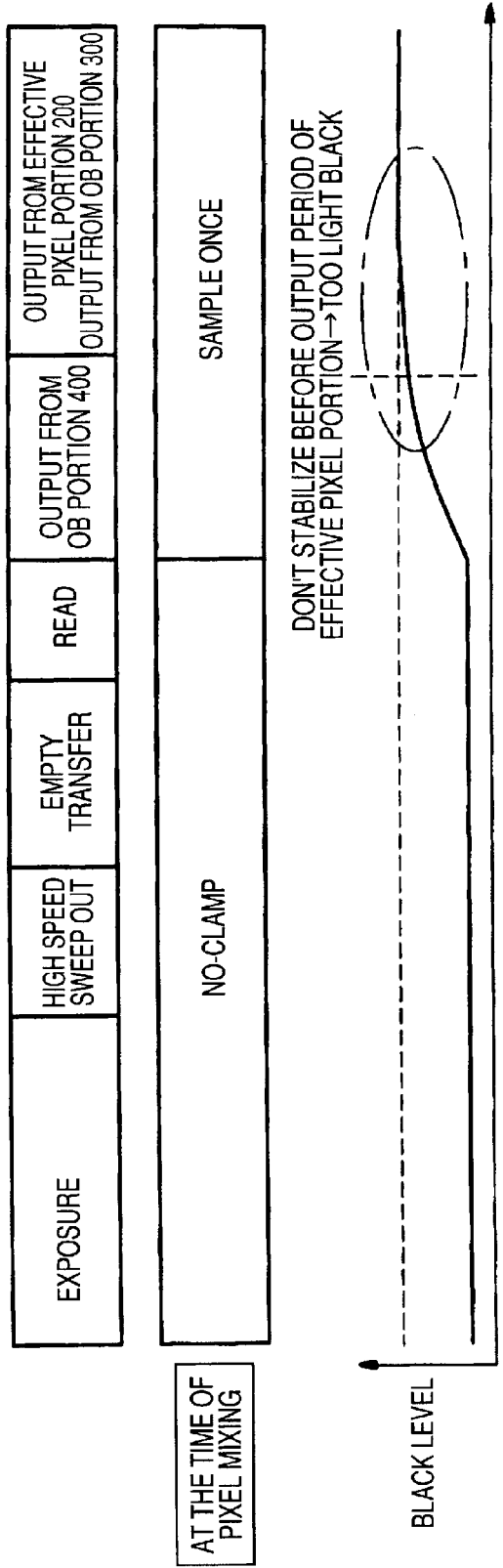
FIG. 14 is a view showing an operation sequence of the solid-state imaging device shown in FIG. 12 at a time of pixel mixture driving.
Figure 15:
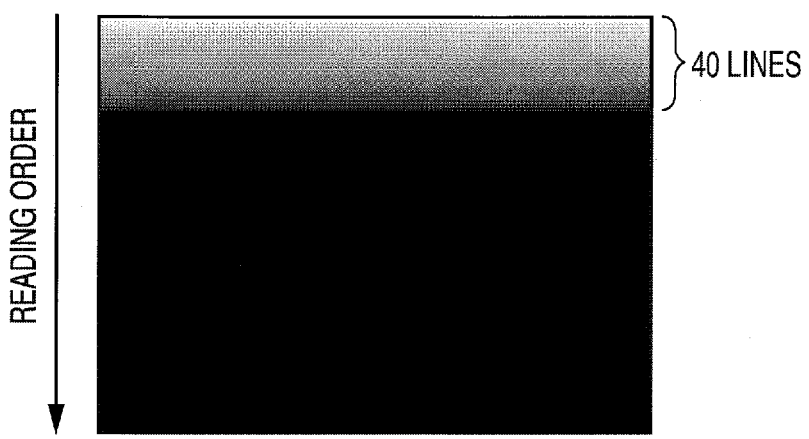
FIG. 15 is a view showing a screen display example in making the dark time photographing with the conventional solid-state imaging device.

An imaging system of a digital camera includes, in order from a subject side, an imaging lens 1, a diaphragm 2, an infrared cut filter 3, an optical low pass filter 4, and a solid-state imaging device 5 of the CCD type with the configuration of FIG. 12, as shown in FIG. 1. The solid-state imaging device 5 may be of the CMOS type having a pixel area 100 (shown in FIG. 12) in which a CMOS circuit for outputting a voltage signal according to a charge generated by each photoelectric conversion element of the pixel area 100 is provided near the photoelectric conversion element to take out the imaging signal. In the CMOS type, the imaging signals may be output for every line from the OB-portion-400 side of the pixel area 100, for example.

A system control section 11 for generally controlling the entire electrical control system of the digital camera performs an AF process for adjusting a position of the imaging lens 1 to a focus position by controlling a lens driving section 13, and makes a zoom adjustment. The system control section 11 also performs an exposure adjustment by controlling an aperture amount of the diaphragm 2 via a diaphragm driving section 12.

Also, the system control section 11 drives the solid-state imaging device 5 via an imaging device driving section 10 to output a subject image captured through the imaging lens 1 as an imaging signal. An instruction signal from a user is input through an operation section 14 into the system control section 11. The operation section 14 may include a shutter button for inputting a shooting instruction.

The electrical control system for the digital camera further includes a CDS circuit 6, a variable gain amplifier (VGA) 7, an AD converter 8, and a clamp circuit 9. The CDS circuit 6 performs a correlation double sampling process, and is connected to an output of the solid-state imaging device 5. The VGA 7 amplifies the imaging signal output from the CDS circuit 6 at a variable gain. The AD converter 8 converts the imaging signal amplified by the VGA 7 into a digital signal. The clamp circuit 9 calculates a moving average of n (n is a natural number of 2 or greater; in the following description, it is assumed that n=1,000) OB signals among the imaging signals output from the AD converter 8, determines a black level of the effective signals, and subtracts the determined black level from the effective signals output from the AD converter 8 to thereby output effective signals with reference to the optical black. The system control section 11 controls the CDS circuit 6, the VGA 7, the AD converter 8, and the clamp circuit 9. The clamp circuit 9 may be provided between the CDS circuit 6 and the VGA 7, or between the VGA 7 and the AD converter 8.

Also, the electrical control system of this digital camera includes a main memory 16 such as SDRAM, a memory control section 15, a digital signal processing section 17, a compression/decompression processing section 18, a control switching operation section 19, an external memory control section 20, and a display control section 22. The memory control section 15 is connected to the main memory 16. The digital signal processing section 17 performs a predetermined digital signal process for the imaging signals output from the clamp circuit 9 to generate image data. The compression/decompression processing section 18 compresses the image data generated by the digital signal processing section 17 in the JPEG format and/or decompresses the compressed image data. The control switching operation section 19 instructs to switch control performed by the system control section 11. A removable recording medium 21 is connected to the external memory control section 20. A liquid crystal display section 23 mounted on the back of the camera is connected to display control section 22. The main memory 16, the memory control section 15, the digital signal processing section 17, the compression/decompression processing section 18, the control switching operation section 19, the external memory control section 20, and the display control section 22 are mutually connected via a control bus 24 and a data bus 25, and are controlled based on commands from the system control section 11.

A temperature sensor 26 for detecting a temperature of the solid-state imaging device 5 is provided near the solid-state imaging device 5, and temperature information detected by the temperature sensor 26 is notified to the system control section 11.

Figure 2:
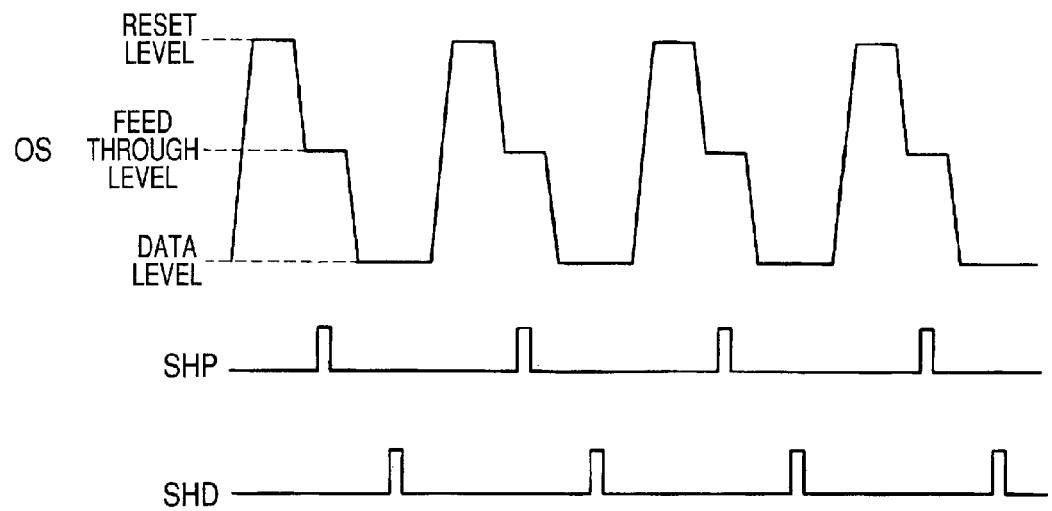
FIG. 2 is a view for explaining processing in a CDS circuit of the imaging apparatus as shown in FIG. 1.

Charges accumulated in a charge storage area (FD section) of the output section 600, and then a potential change of the FD section due to transfer of new charges to the charge storage area is output as voltage signals from the output section 600. An imaging signal OS output from the output section 600 rises from a reset level to a feed through level and becomes stable, and then rises according to a charge amount accumulated in the FD section to reach a data level, as shown in FIG. 2.

The CDS circuit 6 samples the feed through level of the imaging signal in response to a sampling pulse (SHP) supplied from the system control section 11 (specifically a timing generator provided therein), and samples the data level of the imaging signal in response to a sampling pulse (SHD) supplied from the system control section 11. Further, a reset noise component contained in the imaging signal is removed by subtracting the feed through level from the sampled data level to only extract a data component corresponding to the charge amount transferred to the FD section from the input imaging signal. And, the extracted data component is output as the imaging signal to which the CDS process has been performed.

The system control section 11 is configured to perform (i) first control of supplying the SHD to the CDS circuit 6 only once during a data level output period of the imaging signal and (ii) second control of supplying the SHD to the CDS circuit 6 m times (m is a natural number of 2 or greater) during the data level output period of the imaging signal. FIG. 2 is a view showing processing in the CDS circuit 6 in making the first control is performed.

If the first control is performed, the data component for one imaging signal is extracted only once in the CDS circuit 6, whereby the only one imaging signal is output from the CDS circuit 6. If the second control is performed, the CDS circuit 6 extracts a data component m times for one imaging signal. Therefore, the m imaging signals are output from the CDS circuit 6.

When performing the second control, the system control section 11 drives the solid-state imaging device 5 so that an output frequency of the imaging signal from the solid-state imaging device 5 may be lower than that during a period in which the first control is performed. For example, a driving frequency of the horizontal charge transfer path 500 is made smaller than that for the period in which the first control is performed, to thereby decrease a charge transfer speed in the horizontal charge transfer path 500.

Figure 3:
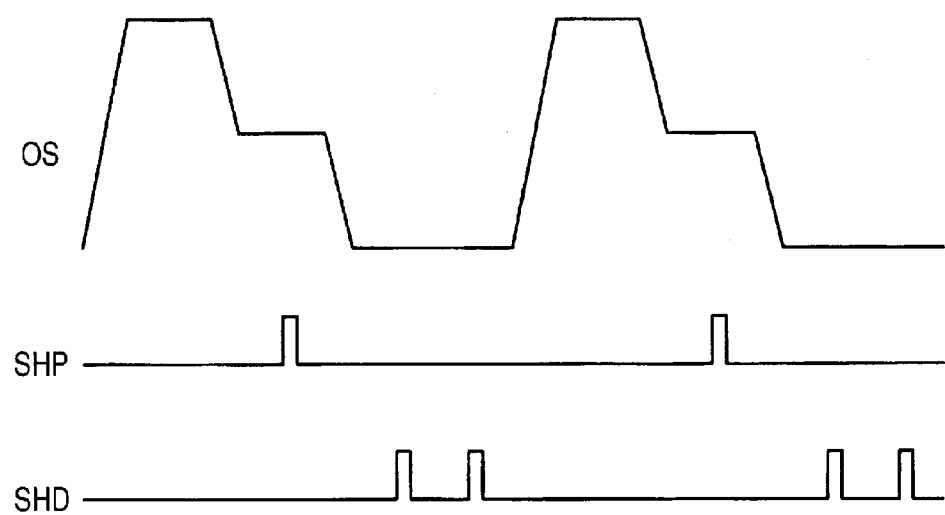
FIG. 3 is a view for explaining the processing in the CDS circuit when second control is performed.

FIG. 3 is a view for explaining the processing in the CDS circuit 6 when the second control is performed.

For example, if the driving frequency of the horizontal charge transfer path 500 is half of that for the period in which the first control is performed, one imaging signal is input into the CDS circuit 6 in the second control during a period in which two imaging signals are input into the CDS circuit 6 in the first control, as shown in FIG. 3. That is, the period in which the data level is input can be made longer than that in FIG. 2.

The second control may be performed without changing the output frequency of the imaging signal from the solid-state imaging device 5. In this case, the SHD is supplied m times within a short period. Therefore, it may be required to enhance the performance of the CDS circuit. To the contrary, if the second control is performed with the output frequency being decreased, the timings of supplying the SHD can be sufficiently separated. Therefore, the CDS circuit having the existing performance can be deal with it.

When the second control is performed, to what extent the output frequency is decreased may be determined in accordance with the value of m and the performance of the CDS circuit 6. Also, in the above explanation, the SHP is supplied once for one imaging signal when the second control is performed. However, the SHP may be supplied m times, like the SHD, to extract the data component m times.

In a situation where the n (=1,000) OB signals, which are required to stabilize the black level, are not output from the solid-state imaging device 5 before it is started to output the effective signal from the solid-state imaging device 5, the system control section 11 may perform the first control and the second control in combination. In such situation, it is assumed that the total number of photoelectric conversion devices contained in the solid-state imaging device 5 is S and that the imaging device driving section 10 drives the solid-state imaging device 5 to output S/M (M is a natural number of 2 or greater) imaging signals from the solid-state imaging device 5. In this example, in order to output the (S/M) imaging signals from the solid-state imaging device 5, a mixing/thinning-out driving is performed in which charges read out from the photoelectric conversion elements are mixed in the vertical charge transfer path or horizontal charge transfer path 500, or charges are read out while being thinned out.

When the mixing thinning driving in which a value of M is "2" is performed, the number of OB signals output from the OB portion 400 is 1,200/2=600. At this time, the system control section 11 switches between the first control and the second control in the following four patterns, for example.

[First Pattern]

Of the 600 OB signals, the system control section 11 performs the second control for a period in which first to 500th OB signals, for example, are output from the solid-state imaging device 5, and performs the first control for the period in which the subsequent imaging signals are output.

[Second Pattern]

Of the 600 OB signals, the system control section 11 performs the first control for a period in which first to 200th OB signals, for example, are output from the solid-state imaging device 5, performs the second control for a period in which the 201th to 600th OB signals are output, and performs the first control for a period where the subsequent imaging signals are output.

[Third Pattern]

Of the 600 OB signals, the system control section 11 performs the second control for a period in which first to 600th OB signals are output from the solid-state imaging device 5, and performs the first control for a period in which the subsequent imaging signals are output.

[Fourth Pattern]

The system control section 11 performs the second control for a period in which the OB signals are output from the solid-state imaging device 5, and performs the first control for a period in which the effective signals are output.

Figure 4:
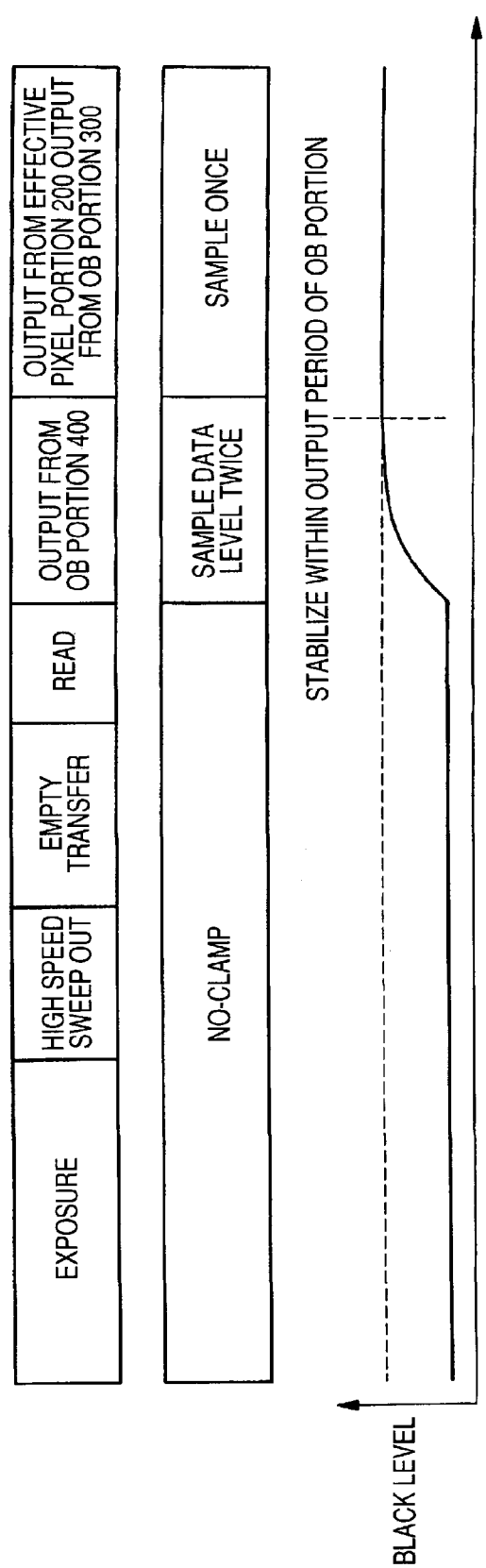
FIG. 4 is a view showing variation of a black level after start of photographing with the digital camera according to the first embodiment.

In this way, the system control section 11 performs the second control for at least a part of the OB signals output during a period from time when it is started to output the imaging signals from the solid-state imaging device 5 to time when the first effective signal is output so that at least n (=1,000) OB signals are input into the clamp circuit 9 for the period. Thereby, the black level can be stabilized before it is started to output the effective signal, as shown in FIG. 4. As a result, a wrong black level ("floating black" or loss of detail in the shadows) can be suppressed.

In a photographing mode (e.g., a mode without charges being mixed or thinned out) in which n (=1,000) OB signals required to stabilize the black level are output from the solid-state imaging device 5 before it is started to output the effective signal from the solid-state imaging device 5, the system control section 11 may only perform the first control.

Figure 5:
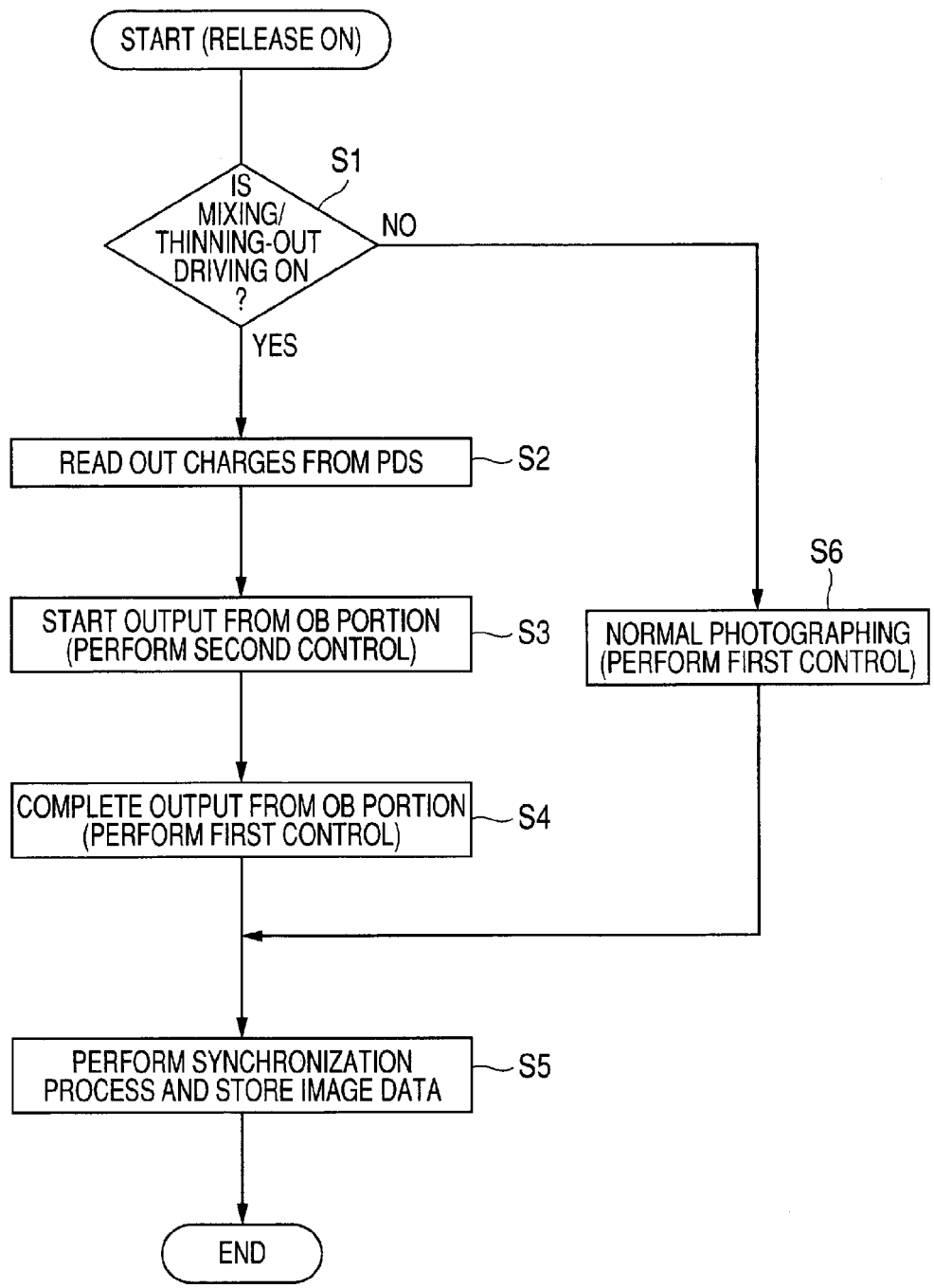
FIG. 5 is a flowchart for explaining a photographing operation of the digital camera according to the first embodiment.

FIG. 5 is a flowchart for explaining a photographing operation of the digital camera according to the first embodiment when the third pattern is employed.

If a photographing mode is set up and a shooting instruction is given, the control switching operation section 19 determines as to whether or not the set-up photographing condition is one for performing the mixing/thinning-out driving (step S1). If the determination at step S1 is YES, the control switching operation section 19 issues an instruction of performing the first control and the second control in combination to the system control section 11.

Then, charges are read out from the photoelectric conversion elements after the end of exposure (step S2), and the mixing/thinning-out driving is performed. If it is started to output the OB signals from the OB portion 400 of the solid-state imaging device 5, the system control section 11 performs the second control (step S3).

The control switching operation section 19 determines the value of m, which is set at the time of the second control, according to the value of M based on the photographing condition, the value of n and the total number of photoelectric conversion elements in the OB portion 400, and notifies the determined value of m to the system control section 11. For example, if M=2, n=1,000, and the total number of photoelectric conversion elements in the OB portion 400=500, the value of m is set to 4.

During the period in which the second control is performed, an output speed of the imaging signals from the solid-state imaging device 5 is made slower, and m imaging signals are extracted from one imaging signal by the CDS circuit 6 and input into a circuit at a latter stage.

If it is ended to output the OB signals from the OB portion 400, the system control section 11 performs the first control (step S4). And, an operation similar to a related art is performed since it is started to output the effective signals. The image data is generated and recorded in the recording medium 21 (step S5).

If the determination at step S1 is NO, the control switching operation section 19 issues an instruction of performing the first control to the system control section 11. The first control is performed during the period in outputting the imaging signals are output (step S6), and image data is generated and recorded (step S5).

As described above, by switching between the first control and the second control only at the time of the pixel mixing driving or at the time of the pixel thinning-out read driving in which a wrong black level ("floating black" or loss of detail in the shadows) may be conspicuous, it can be prevented to lower a photographing processing speed during a normal photographing in which the pixel mixing driving or the pixel thinning-out read driving is not performed. Thereby, the efficient control can be performed. Of course, even in the normal photographing, the photographing process may be performed with the first control and the second control being performed in combination, in the same way as that at the time of the pixel mixing driving or the pixel thinning-out read driving.

(Second Embodiment)

From the above description, it can be understood that if the first control and the second control are performed in combination, there is no problem that the number of OB pixel areas provided in the OB portion 400 is less than n (=1,000). In this embodiment, a digital camera in which the number of OB pixel areas provided in the OB portion 400 is 600, for example, will be described below. In the following description, driving the solid-state imaging device 5 to output S imaging signals from the solid-state imaging device 5 will be referred to as "normal driving".

<At the Time of the Normal Driving>

The system control section 11 of the digital camera according to this embodiment always performs control of any of the above first to fourth patterns during the output period of the imaging signals at the time of performing the normal driving. Thereby, a wrong black level ("floating black" or loss of detail in the shadows) can be prevented at any time.

Also, when the normal driving is performed, the system control section 11 (a) performs only the first control at the time of photographing under a photographing condition that it is determined that the black level is small, such as (i) when a magnitude of a gain set by the VGA 7 is less than a threshold value or (ii) when a temperature detected by the temperature sensor 26 is lower than a threshold value, or (b) performs control of any of the first to fourth patterns at the time of photographing under a photographing condition that it is determined that the black level is large, such as (iii) when the magnitude of the gain set by the VGA 7 is equal to or greater than the threshold value or (iv) when the temperature detected by the temperature sensor 26 is equal to or higher than the threshold value.

When the solid-state imaging device 5 of the digital camera has the configuration according to this embodiment, if only the first control is performed, the black level cannot be stabilized before it is started to output the effective signals. Thus, a wrong black level ("floating black" or loss of detail in the shadows) would occur. However, if the gain set by the VGA 7 is less than the threshold value (e.g., at the time of low ISO speed) or if the temperature of the solid-state imaging device 5 is lower than the threshold value, the black level itself becomes often small. Therefore, a wrong black level ("floating black" or loss of detail in the shadows) would be hardly conspicuous.

If the gain set by the VGA 7 is equal to or greater than the threshold value or if the temperature of the solid-state imaging device 5 is equal to or higher than the threshold value (e.g., at the time of high ISO speed or long time exposure), the black level itself becomes large, and a subject is often dark. Therefore, a wrong black level ("floating black" or loss of detail in the shadows) would be conspicuous. Thus, only if the gain set by the VGA 7 is equal to or greater than the threshold value or the temperature of the solid-state imaging device 5 is equal to or higher than the threshold value, the first control and the second control are performed in combination. Thereby, a frequency at which the photographing processing speed falls can be reduced, and the efficient control can be performed.

<At the Time of the Mixing/Thinning-Out Driving>

When the mixing/thinning-out driving is performed, the system control section 11 of the digital camera according to this embodiment performs the second control for at least a part of the OB signals output during a period from the time when it is started to output the imaging signals from the solid-state imaging device 5 to the time when it is started to output the first effective signal so that at least n (=1,000) OB signals are input into the clamp circuit 9 for that period, and performs the first control for the other imaging signals.

For example, when the mixing/thinning driving is performed with the value of M being "2", only 300 OB signals are output from the OB portion 400. Therefore, the system control section 11 performs the control in the following patterns.

[Fifth Pattern]

Of the 300 OB signals, the system control section 11 performs the second control with m=4 for a period in which first to 300th OB signals, for example, are output from the solid-state imaging device 5, and performs the first control for a period in which the subsequent imaging signals are output.

[Sixth Pattern]

Of the 300 OB signals, the system control section 11 performs the second control with m=4 for a period in which first to 250th OB signals, for example, are output from the solid-state imaging device 5, and performs the first control for a period in which the subsequent imaging signals are output.

[Seventh Pattern]

The system control section 11 performs the second control with m=4 for a period in which the OB signals are output from the solid-state imaging device 5, and performs the first control for a period in which the effective signals are output.

Figure 6:
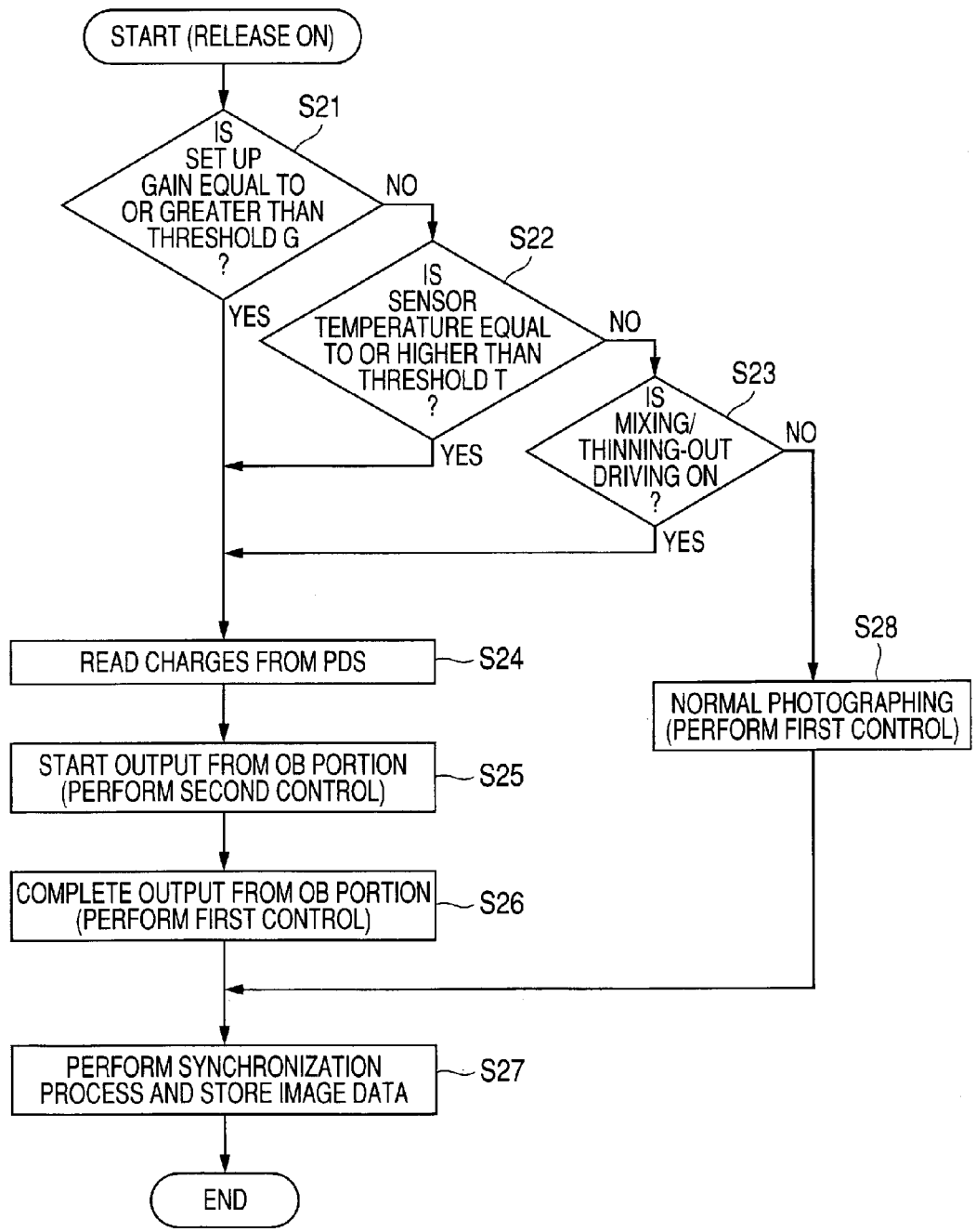
FIG. 6 is a flowchart for explaining a photographing operation of the digital camera according to a second embodiment.

FIG. 6 is a flowchart for explaining the photographing operation of the digital camera according to the second embodiment, when the third to fifth patterns are employed.

If a photographing mode is set up and a shooting instruction is given, the control switching operation section 19 determines as to whether or not the gain, which is set by the VGA 7 based on the set up photographing condition, is equal to or greater than a threshold value G (step S21). If the gain is less than the threshold value G, the control switching operation section 19 determines as to whether or not the temperature of the solid-state imaging device 5 is equal to or higher than a threshold value T (step S22).

If the temperature of the solid-state imaging device 5 is lower than the threshold value T, the control switching operation section 19 determines as to whether or not it is required to perform the mixing/thinning-out driving under the set up photographing condition. If it is not required to perform the mixing/thinning-out driving (step S23: NO), the control switching operation section 19 issues an instruction of performing the first control to the system control section 11. Then, the first control is performed (step S28), and image data is generated and recorded (step S27).

If the determination at step S21 or step S22 is YES or if it is required to perform the mixing/thinning-out driving (step S23: YES), the control switching operation section 19 instructs the system control section 11 to perform the first control and the second control in combination.

Charges are read out from the photoelectric conversion elements after the end of exposure (step S24). If it is started to output the OB signals from the OB portion 400 of the solid-state imaging device 5, the system control section 11 performs the second control (step S25). The control switching operation section 19 determines the value of m in the second control in accordance with the value of M based on the photographing condition, the value of n and the total number of photoelectric conversion elements in the OB portion 400, and notifies the determined value of m to the system control section 11. An output speed of the imaging signals from the solid-state imaging device 5 is made slower during a period in which the second control is performed. Thereby, m imaging signals are extracted from one imaging signal by the CDS circuit 6 and input into a circuit at a latter stage.

If it is ended to output the OB signals from the OB portion 400, the system control section 11 performs the first control (step S26). Then, an operation similar to the related art is performed since it is started to output the effective signals. Then, image data is generated and recorded in the recording medium 21 (step S27).

As described above, by switching between the first control and the second control only during the mixing/thinning-out driving in which a wrong black level ("floating black" or loss of detail in the shadows) would be conspicuous, or only at a high ISO speed or a long time exposure, a frequency at which the photographing processing speed falls can be reduced, and the efficient control can be made. In FIG. 6, step S23 may be omitted, and the flow may proceed to step 28 if determination at step S22 is NO.

(Third Embodiment)

In the first embodiment, since the method of decreasing the output frequency of the imaging signals from the solid-state imaging device 5 when the second control is performed is employed, the second control can performed without the performance of the CDS circuit 6 being enhanced. In a third embodiment, another example of this method will be described.

Figure 7:
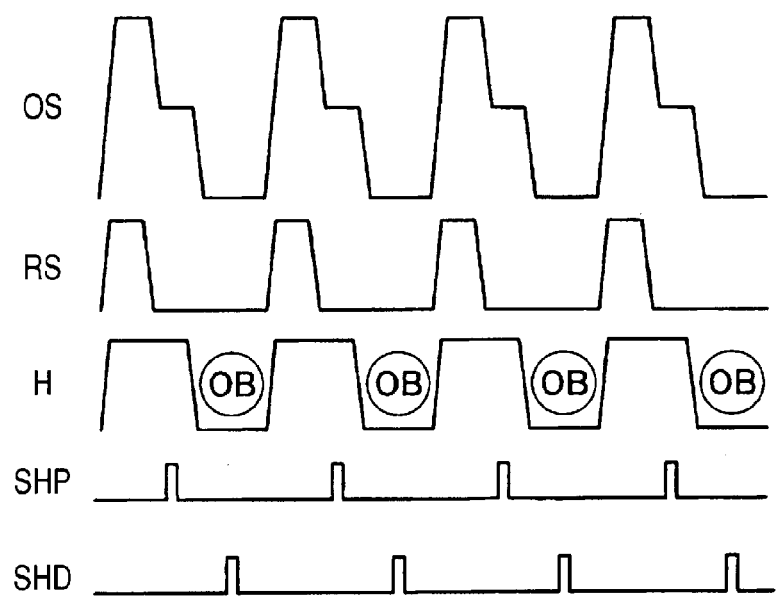
FIG. 7 is a view for explaining operation states of the digital camera according to a third embodiment when first control is performed.

FIG. 7 is a view for explaining operation states of the digital camera when the first control is performed.

In FIG. 7, "RS" denotes a reset pulse for resetting charges in the output section 600, and "H" denotes a cross-section potential in the horizontal charge transfer path 500. Also, "OB" shown in FIG. 7 denotes a charge corresponding to an OB signal and indicates that this charge is stored in a potential well (charge storage packet) formed in the horizontal charge transfer path 500.

As shown in FIG. 7, when the first control is performed, a charge storage packet and a potential barrier are alternately formed in the horizontal charge transfer path 500. After the reset pulse is applied, an operation of transferring the charge in each charge storage packet to the output section 600 and outputting the imaging signal OS from the output section 600 is repeatedly performed.

Figure 8:
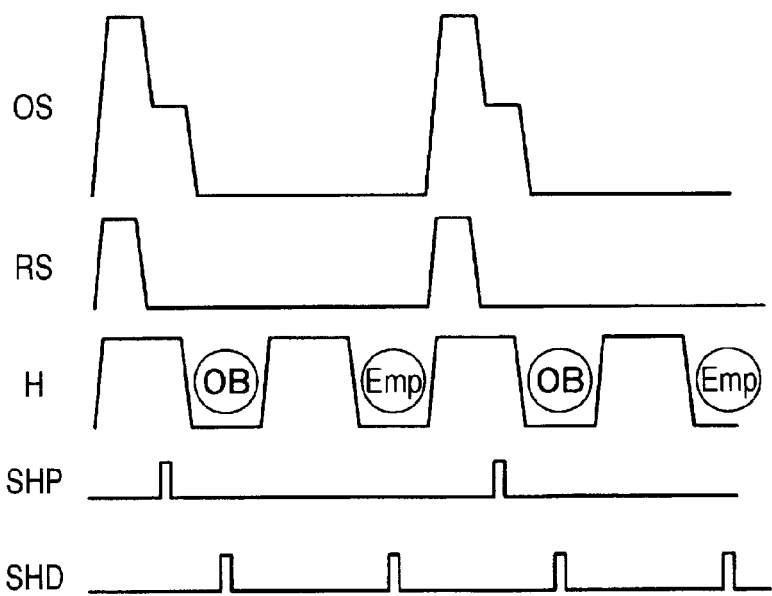
FIG. 8 is a view for explaining operation states of the digital camera according to the third embodiment when the second control is performed.

In the first embodiment, when the second control is performed, the driving frequency of the horizontal charge transfer path 500 is decreased. Thereby, as shown in FIG. 3, the output period of each of the reset level, the feed through level and the data level of the imaging signal OS is lengthened. As a result, it can be avoided to enhance the performance of the CDS circuit 6. On the other hand, in this embodiment, the imaging device driving section 10 alternately forms a charge storage packet and an empty packet (indicated as "Emp" in FIG. 8) in which a charge read out from a photoelectric conversion element is not stored in the horizontal charge transfer path 500 for a period (period in making the second control is performed, for example, a period in which the imaging signals are output from the OB portion 400) in which OB signals to extract a data component m (m=2 in this embodiment) times are output, as shown in FIG. 8. This empty packet may store some charge, but an amount of the stored charge is so slight as to be negligible.

The imaging device driving section 10 transfers the charges in the charge storage packet to the output section 600 to output the OB signal according to the charges, and then transfers the charges in the empty packet to the output section 600 without resetting the charges in the output section 600, thereby mixing the charges in the empty packet and the charges stored in the output section 600. By this mixture, the data level of the OB signal slightly rises, but this rise is so small as to be negligible. The imaging device driving section 10 applies a reset pulse to reset the charges in the output section 600 after completion of transferring the charges in the empty packet. And, the imaging device driving section 10 repeats the driving of (i) transferring the charges in the next charge storage packet to the output section 600 and (ii) transferring the charges in the empty packet to the output section 600 without resetting the charges in the output section 600.

Figure 9:
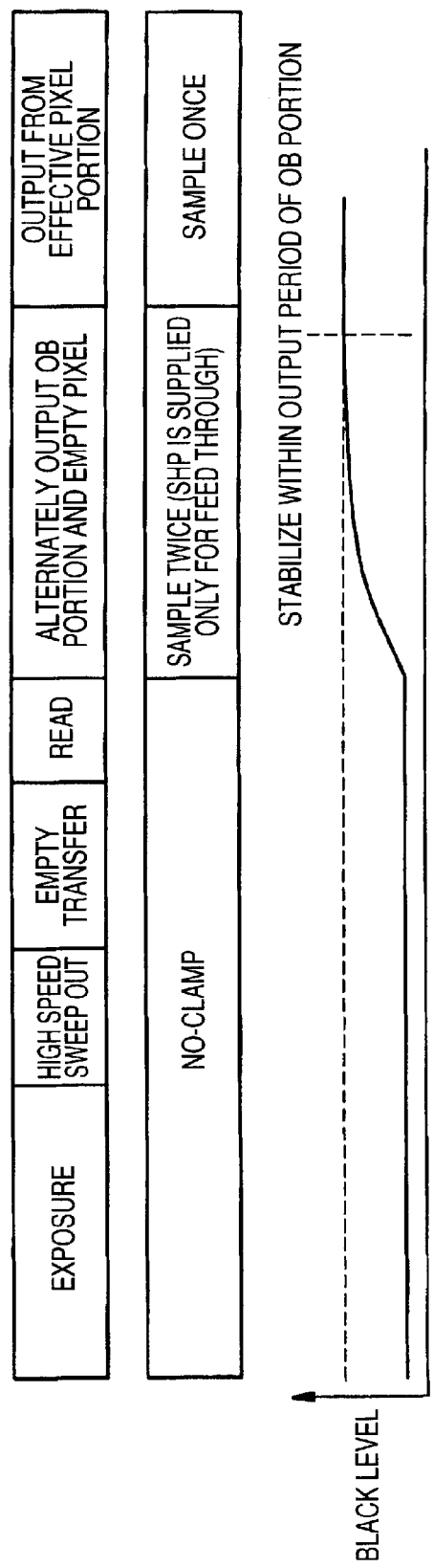
FIG. 9 is a view showing variation of the black level after start of photographing with the digital camera according to the third embodiment.

With such driving, as shown in FIG. 8, the output period of the data level for the OB signal can be lengthened. Thereby, the second control can be performed without the performance of the CDS circuit 6 being enhanced. Also, since the data component can be extracted m times, the black level can be stabilized before it is started to output the effective signals. Thus, a wrong black level ("floating black" or loss of detail in the shadows) can be prevented as shown in FIG. 9.

In the above explanation, since m is set to 2 (m=2), the charge storage packet and the empty packet are alternately formed in the horizontal charge transfer path 500. However, the number of empty packets may be changed appropriately depending on the value of m. That is, to extract the data component m times for one imaging signal, the charge storage packet and the (m−1) empty packets may be alternately formed in the horizontal charge transfer path 500, and the charges in the (m−1) empty packets may be transferred to the output section 600 during the output period of the imaging signal according to the charges in one charge storage packet.

One example of the method for driving the solid-state imaging device in which the charge storage packet and the empty packet are alternately formed one by one in the horizontal charge transfer path 500 will be described below.

FIGS. 10 and 11 are views for explaining one example of the method for driving the solid-state imaging device in which the charge storage packet and the empty packet are alternately formed one by one in the horizontal charge transfer path 500.

In FIGS. 10 and 11, blocks with "R" denote the photoelectric conversion elements for generating charges of the red component, blocks with "G" denotes the photoelectric conversion elements for generating charges of the green component, and blocks with "B" denote the photoelectric conversion elements for generating charges of the blue component. Also, in FIG. 11, it is assumed that the solid-state imaging device has a line memory "LM", and that the horizontal charge transfer path 500 can be driven in eight phases.

Figure 10A:
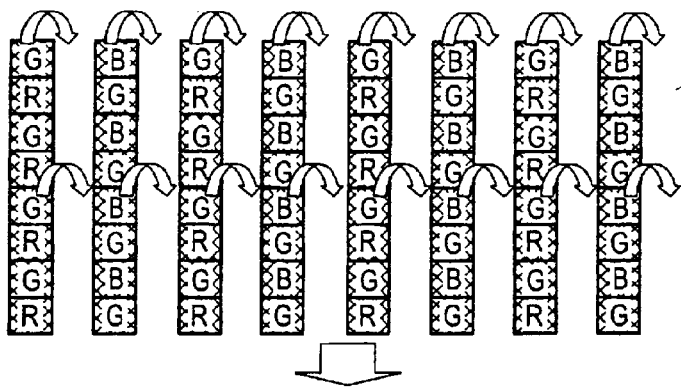
FIGS. 10A to 10D are views for explaining one example of a method for driving a solid-state imaging device in which a charge storage packet and an empty packet are alternately formed one by one in the horizontal charge transfer path.
Figure 10B:
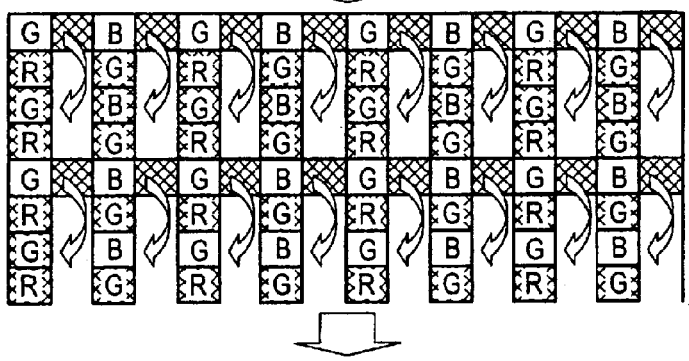
Figure 10C:
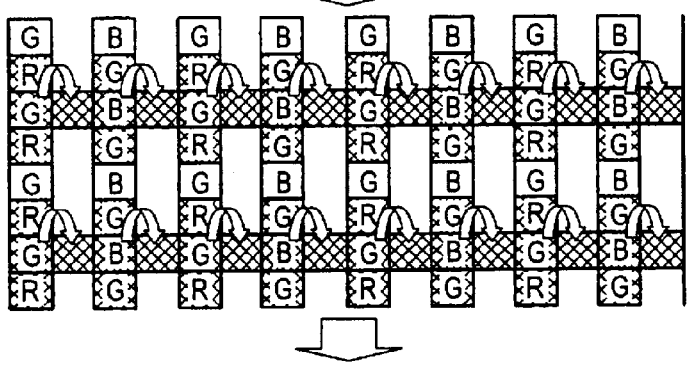
Figure 10D:
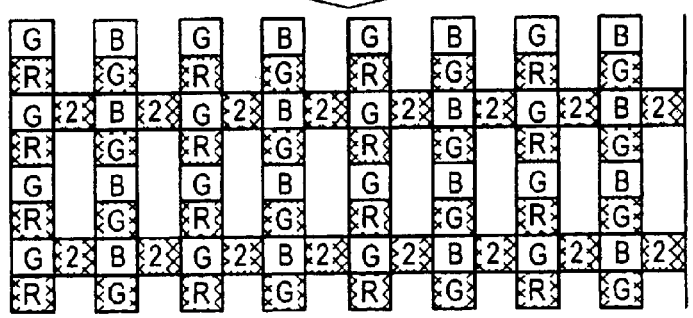

As shown in FIG. 10, an example of the driving method in which the value of M is 2 reads out charges are from the first line and the fifth line to the vertical charge transfer path (FIG. 10A), and transfers the read-out charges to positions adjacent to the third line and the seventh line (FIG. 10B). Then, the charges of the same color component are mixed by reading out charges from the third line and the seventh line to the vertical charge transfer path (FIG. 10C). After the mixture, the charges are transferred in the vertical direction as usual. With this method, vertical two pixel mixing is performed (FIG. 10D).

Figure 11A:
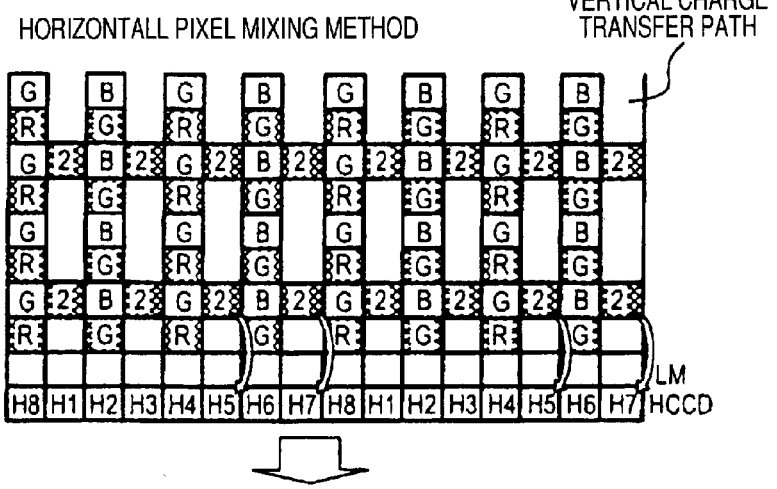
FIGS. 11A to 11E are views for explaining another example of the method for driving the solid-state imaging device in which the charge storage packet and the empty packet are alternately formed one by one in the horizontal charge transfer path.
Figure 11B:
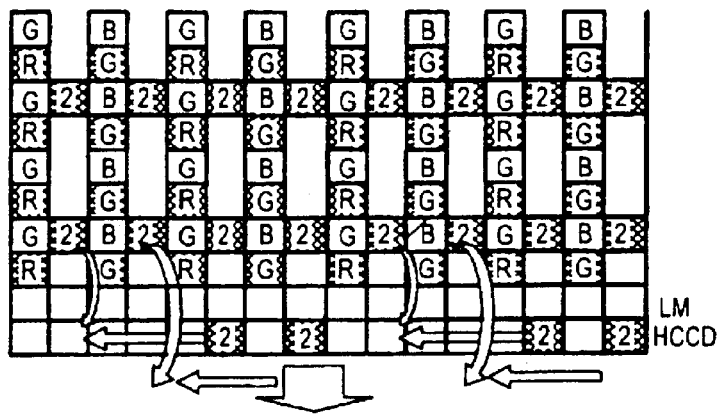
Figure 11C:
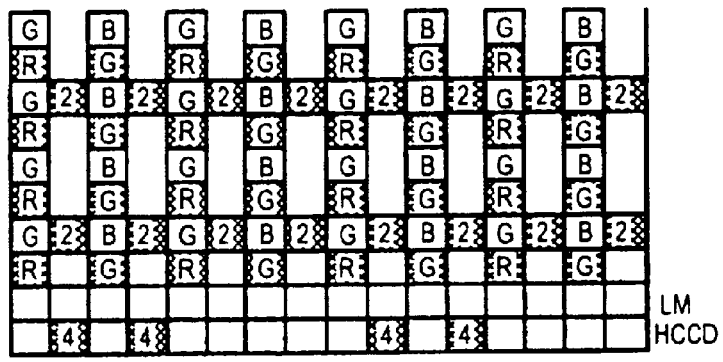
Figure 11D:
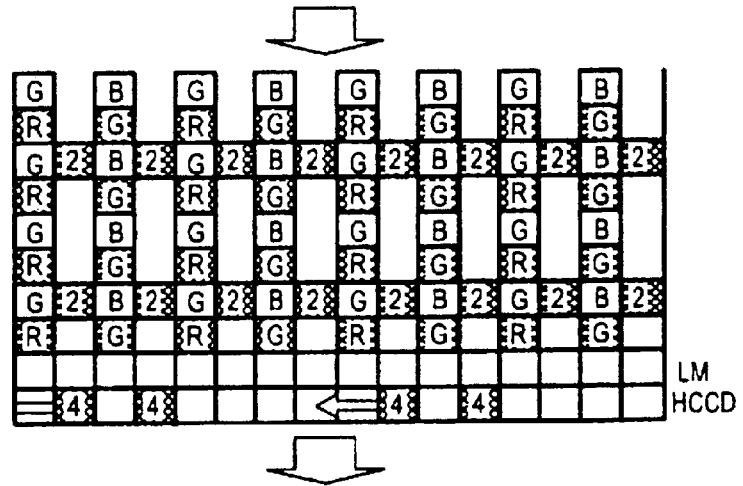
Figure 11E:
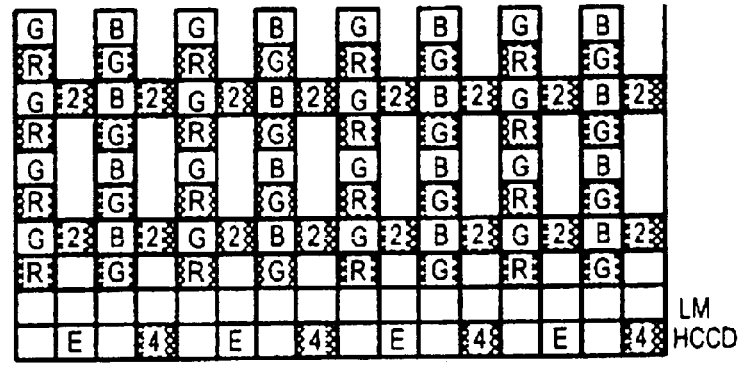

After the vertical two pixel mixing is performed as shown in FIGS. 10A to 10D, of the charges in one line, two adjacent charges for every two columns are transferred to the horizontal charge transfer path 500 (FIG. 11A). Then, the charges are transferred by two columns in the horizontal charge transfer path 500, and the remaining charges of the charges of the one line are transferred to the horizontal charge transfer path 500, to thereby mix the charges of the same color component (FIGS. 11B and 11C). Then, one of two different color components of charges in the horizontal charge transfer path 500 is transferred by one column (FIG. 11D). Thereby, a state where the charge storage packet and the empty packet are alternately formed can be achieved (FIG. 11E).

What is claimed is:
1. An imaging apparatus comprising:
a solid-state imaging device including
a plurality of effective pixel areas that receive subject light to generate charges, and
a plurality of OB pixel areas that is light-shielded and outputs black level determination signals;
a data component extraction unit that extracts data components excluding noise components from (i) effective signals output from the effective pixel areas and (ii) OB signals output from the OB pixel areas, wherein imaging signals output from solid-state imaging device include the effective signals and the OB signals; and
a black level determination unit that determines a black level of the data components of the effective signals by calculating an average of n data components of the OB signals extracted by the data component extraction unit, where n is a natural number of 2 or greater, wherein
the data component extraction unit performs a multiple extraction process of extracting a data component from one imaging signal m times, for each of at least a part of the OB signals, which are output from the solid-state imaging device, where m is a natural number of 2 or greater.

2. The imaging apparatus according to claim 1, wherein the data component extraction unit extracts the m data components in the multiple extraction process by sampling a feed through level of the one imaging signal once, sampling a data level of the one imaging signal m times, and obtaining a difference between each of the m data levels and the one feed through level.

3. The imaging apparatus according to claim 1, wherein the data component extraction unit performs the multiple extraction process for at least a part of the OB signals, which are output during a period from time when the solid-state imaging device starts to output the imaging signal to time when the solid-state imaging device outputs the first effective signal, so that n data components of the OB signals are input into the black level determination unit during the period.

4. The imaging apparatus according to claim 1, further comprising:
a driving unit that drives the solid-state imaging device so that an output frequency of the imaging signals from the solid-state imaging device during a period in which the at least part of the OB signal to be subjected to the multiple extraction process are output is lower than that during a period in which the imaging signals other than the OB signals are output.

5. The imaging apparatus according to claim 1, further comprising:
a driving unit, wherein
when the solid-state imaging device is to output the at least part of the OB signals to be subjected to the multiple extraction process, the driving unit alternately forms (i) a charge storage packet corresponding to each OB signal and (ii) (m−1) empty packets corresponding to the charge storage packet for each OB signal on a horizontal charge transfer path of the solid-state imaging device, and transfers charges in the empty packets to an output section of the solid-state imaging device without resetting a charge transferred from the one of the charge storage packets to the output section after the charge of one of the charge storage packets is transferred to the output section to cause the output section to output a voltage signal in response to the charge of the one of the charge storage packets and before a charge in the charge storage packet next to the one of the charge storage packets is transferred to the output section.

6. The imaging apparatus according to claim 1, wherein
S denotes the maximum number of imaging signals that can be output from the solid-state imaging device,
M is a natural number of 2 or greater,
if the solid-state imaging device is driven in a mode in which the number of imaging signals output from the solid-state imaging device is equal to S/M, the data component extraction unit performs the multiple extraction process, and
if the solid-state imaging device is driven in another mode in which the number of imaging signals output from the solid-state imaging device is equal to S, the data component extraction unit only performs a single extraction process of extracting a data component from one imaging signal once.

7. The imaging apparatus according to claim 1, further comprising:
an amplification unit that amplifies the imaging signals output from the solid-state imaging device, wherein
if a gain set to the amplification unit is equal to or greater than a threshold value, the data component extraction unit performs the multiple extraction process, and
if the gain is lower than the threshold value, the data component extraction unit only performs a single extraction process of extracting a data component from one imaging signal once.

8. The imaging apparatus according to claim 1, further comprising:
a temperature detection unit that detects a temperature of the solid-state imaging device, wherein
if the temperature detected by the temperature detection unit is equal to or higher than a threshold value, the data component extraction unit performs the multiple extraction process, and
if the temperature is lower than the threshold value, the data component extraction unit only performs a single extraction process of extracting a data component from one imaging signal once.

9. A photographing control method for use in an imaging apparatus including
a plurality of effective pixel areas that receive subject light to generate charges, and
a plurality of OB pixel areas that is light-shielded and outputs black level determination signals,
the method comprising:
extracting data components excluding noise components from (i) effective signals output from the effective pixel areas and (ii) OB signals output from the OB pixel areas, wherein imaging signals output from solid-state imaging device include the effective signals and the OB signals; and
determining a black level of the data components of the effective signals by calculating an average of n extracted data components of the OB signals, wherein n is a natural number of 2 or greater, wherein
the extracting includes performing a multiple extraction process of extracting the data component from one imaging signal m times, for each of at least a part of the OB signals, which are output from the solid-state imaging device, m being a natural number of 2 or greater.

10. The photographing control method according to claim 9, wherein the multiple extraction process extracts the m data components by sampling a feed through level of the one imaging signal once, sampling a data level of the one imaging signal m times, and obtaining a difference between each of the m data levels and the one feed through level.

11. The photographing control method according to claim 9, wherein the extracting includes performing the multiple extraction process for at least a part of the OB signals, which are output during a period from time when the solid-state imaging device starts to output the imaging signal to time when the solid-state imaging device outputs the first effective signal, so that n data components of the OB signals are input during the period into a black level determination unit that determines the black level.

12. The photographing control method according to claim 9, further comprising:
driving the solid-state imaging device so that an output frequency of the imaging signals from the solid-state imaging device during a period in which the at least part of the OB signal to be subjected to the multiple extraction process are output is lower than that during a period in which the imaging signals other than the OB signals are output.

13. The photographing control method according to claim 9, further comprising:
when the solid-state imaging device is to output the at least part of the OB signals to be subjected to the multiple extraction process, alternately forming (i) a charge storage packet corresponding to each OB signal and (ii) (m−1) empty packets corresponding to the charge storage packet for each OB signal on a horizontal charge transfer path of the solid-state imaging device, transferring a charge of one of the charge storage packets to an output section of the solid-state imaging device to cause the output section to output a voltage signal in response to the charge of the one of the charge storage packets, and thereafter, transferring charges in the empty packets to the output section without resetting the charge transferred from the one of the charge storage packet to the output section before a charge in a next charge storage packet is transferred to the output section.

14. The photographing control method according to claim 9, wherein

S denotes the maximum number of imaging signals that can be output from the solid-state imaging device, M is a natural number of 2 or greater, if the solid-state imaging device is driven in a mode in which the number of imaging signals output from the solid-state imaging device is equal to S/M, the extracting performs the multiple extraction process, and if the solid-state imaging device is driven in another mode in which the number of imaging signals output from the solid-state imaging device is equal to S, the extracting only performs a single extraction process of extracting a data component from one imaging signal once.

15. The photographing control method according to claim 9, further comprising:

amplifying the imaging signals output from the solid-state imaging device, wherein if a gain set for the amplifying is equal to or greater than a threshold value, the extracting performs the multiple extraction process, and if the gain is lower than the threshold value, the extracting only performs a single extraction process of extracting a data component from one imaging signal once.

16. The photographing control method according to claim 9, further comprising:

detecting a temperature of the solid-state imaging device, wherein if the detected temperature is equal to or higher than a threshold value, the extracting performs the multiple extraction process, and if the detected temperature is lower than the threshold value, the extracting only performs a single extraction process of extracting a data component from one imaging signal once.

* * * * *